Feb. 15, 1966 W. J. TRAMPOSCH 3,235,812

APPARATUS FOR GENERATING AN ELECTRICAL SIGNAL

Filed Oct. 4, 1961 2 Sheets-Sheet 1

Feb. 15, 1966 W. J. TRAMPOSCH 3,235,812

APPARATUS FOR GENERATING AN ELECTRICAL SIGNAL

Filed Oct. 4, 1961 2 Sheets-Sheet 2

United States Patent Office 3,235,812
Patented Feb. 15, 1966

3,235,812
APPARATUS FOR GENERATING AN ELECTRICAL SIGNAL

Walter J. Tramposch, Stony Brook, N.Y., assignor to Hazeltine Research, Inc., a corporation of Illinois Filed Oct. 4, 1961, Ser. No. 142,931
8 Claims. (Cl. 329—126)

*General*

Figure 1:
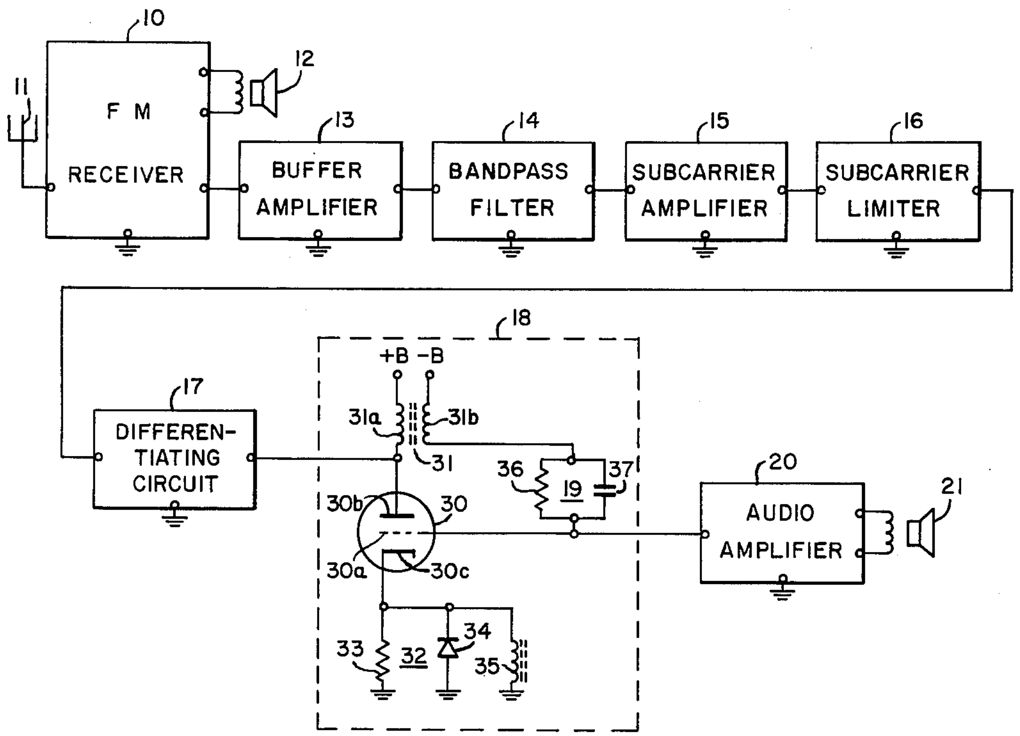

This invention relates to apparatus for generating electrical signals and particularly to a pulse generator for developing variable duration pulses. The invention has particular application in improving the audio recovery of a counter-type detector used to detect the modulation of a frequency-modulated subcarrier of a frequency-modulated multiplex signal. The invention additionally has application in developing a series of pulses whose durations vary in some particular manner as a function of the number of pulses developed. While the invention will be described in these environments, it will be obvious that its application is not limited thereto.

The frequency-modulated multiplex signal mentioned above may be an SCA (Subsidiary Communications Authorization) type signal wherein a subcarrier in the order of 50 kilocycles is frequency modulated by a subcarrier modulating signal. The main carrier in the order of 100 megacycles and representative of a FM broadcast signal frequency is frequency modulated by both a main modulating signal and the frequency-modulated subcarrier signal. Thus, two modulating signals are transmitted in one channel and on one main carrier which is representative of the channel frequency. At the receiving end, the main modulating signal and the subcarrier are detected and separated and the subcarrier modulating signal, in turn, is detected from the subcarrier.

The main modulating signal may be the usual program material and the subcarrier signal may be the familiar subscription type material heard as background music in restaurants, stores and offices.

The conventional technique of detecting the modulation of a frequency-modulated subcarrier signal with a counter-type detector is to amplify and limit the subcarrier signal and to then differentiate the limited signal. Next, either the positive or negative differentiated pulses are counted or integrated in an integrating circuit to derive an audio-frequency signal having an amplitude which varies in proportion to changes in the repetition frequency of the pulses which are counted and which is, therefore, representative of the modulation of the frequency-modulated subcarrier signal. The amplitude of this audio-frequency signal naturally is dependent upon the area under, or the energy of, the differentiated pulses which are counted. Any attempt to increase the amplitude of the audio-frequency signal by merely increasing the time constant of the differentiating circuit to derive differentiated pulses having longer durations and higher average amplitudes results in degradation of the linearity of the detector since at high frequencies the differentiated pulses will have insufficient time to decay to approximately zero before the occurrence of the next differentiated pulse.

The present invention is directed to apparatus for generating a series of pulses to be counted having the same repetition frequency as the differentiated pulses and also having durations which vary in accordance with the repetition frequency. Since both the repetition frequency and the pulse duration of these pulses vary in accordance with the frequency modulation and the audio recovery is dependent upon the product of the two, the characteristic describing audio output versus frequency has a greater slope than for a conventional detector.

Thus, the audio recovery is improved. Linearity over a specified frequency range may be achieved by proper choice of components.

The second application mentioned above, namely the developing of a series of pulses whose durations vary in some particular manner as a function of the number of pulses developed, is particularly suited for a radar transmitter where the radar signal is a pulse train. If the modulated pulse train is transformer coupled from the modulator to the transmitter and the pulse spacing is such that the transformer cannot recover between pulses, the width of the pulses inherently shortens as a function of the number of pulses coupled through the transformer. This pulse shortening may be compensated for by developing a series of modulating pulses whose durations increase. Under this condition the modulated pulses increase in width as a function of the number of pulses developed and the inherent shortening caused by the transformer is offset. A circuit constructed in accordance with the present invention may be used to develop the series of modulating pulses.

Therefore, an object of the present invention is to provide apparatus for developing a series of repetitive signals whose durations vary.

Another object of the present invention is to provide apparatus for developing a series of repetitive signals whose durations are dependent upon the repetition rate of these signals.

A further object of the present invention is to provide apparatus for developing a series of repetitive pulses whose durations vary as a function of the number of pulses developed.

An additional object of the present invention is to provide a frequency-modulation detector having improved audio recovery.

In accordance with the present invention apparatus for generating an electrical signal, comprises means for supplying a repetitive first signal and circuit means responsive to the first signal for generating a second signal having first and second characteristics, at least one of the characteristics being determined by the repetition rate of the first signal. The signal generating apparatus includes a nonlinear energy storage element coupled to the circuit means and being responsive to at least one of the characteristics of the second signal for controlling the circuit means so as to cause the other of the characteristics to vary in a predetermined manner.

For a better understanding of the present invention, together with other and further objects thereof, reference is had to the following description, taken in connection with the accompanying drawings, and its scope will be pointed out in the appended claims.

Figure 2:
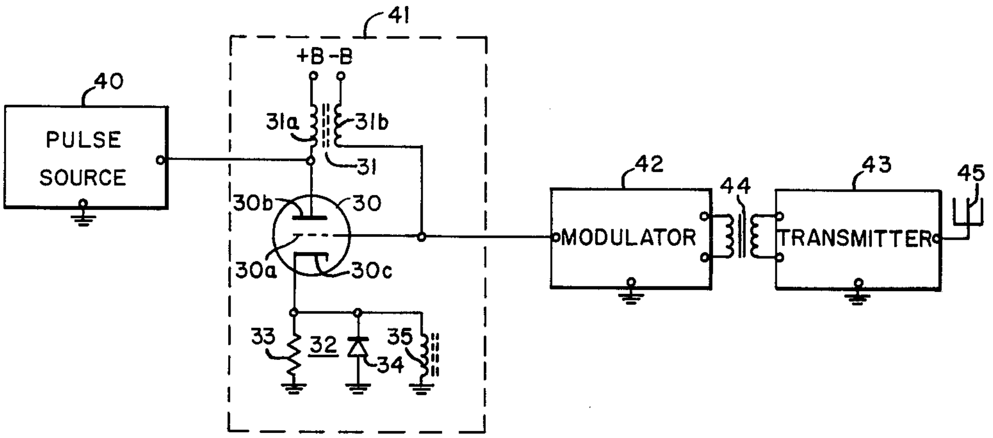

Referring to the drawings:

FIG. 1 shows a circuit diagram, partly schematic, representing a frequency-modulation carrier receiver along with a subcarrier unit which includes apparatus for detecting the modulation of a frequency-modulated subcarrier signal constructed in accordance with the present invention, and FIG. 2 shows a circuit diagram, partly schematic, representing a portion of a radar system which includes a pulse stretching circuit constructed in accordance with the present invention.

*Description and operation of FM receiver*

Referring to FIG. 1 of the drawings there is represented a frequency-modulation carrier receiver 10 of conventional construction along with a subcarrier unit which includes apparatus for detecting the modulation of a frequency-modulated subcarrier signal constructed in accordance with the present invention. The receiver 10 may include the usual circuits normally found in such a device. In particular, the receiver 10 having its input terminal connected to an antenna 11 may include a radio-frequency amplifier, an oscillator-modulator, an intermediate-frequency amplifier, a frequency-modulation detector and an audio-frequency amplifier, all of conventional construction, for deriving in the usual manner an audio-frequency signal representing the main modulating signal. Such a signal may be reproduced in a conventional manner by a sound reproducer 12.

Connected in cascade with the receiver 10 is a subcarrier unit including a buffer amplifier 13, a bandpass filter 14, a subcarrier amplifier 15, a subcarrier limiter 16, a differentiating circuit 17, a pulse generating circuit 18, shown within dotted lines and more fully described hereinafter and having an integrating circuit 19, an audio-frequency amplifier 20 and a sound reproducer 21. All the elements in the subcarrier unit, except the pulse generator 18, may be of conventional construction and operate in the usual manner.

The input circuit of the buffer amplifier 13 is connected to the detector output of the receiver 10. The buffer amplifier 13 serves to isolate the relatively low impedance of the bandpass filter 14 from the relatively high impedance of the detector in the receiver 10. The buffer amplifier 13 should be designed so that its distortion is minimized since harmonics of the main modulating signal may fall within the subcarrier pass band and result in cross talk. The bandpass filter 14 having a pass band substantially equal to the maximum frequency deviation of the subcarrier signal and centered approximately at the subcarrier frequency, passes the subcarrier signal and further attenuates the main channel audio-frequency signal developed by the detector of the receiver 10 as well as noise signals in the frequency range above and below this pass band. The subcarrier signal, in turn, is amplified by the subcarrier amplifier 15 and is amplitude limited by the subcarrier limiter 16. The amplitude limited subcarrier signal is supplied to the differentiating circuit 17 which differentiates the amplitude limited signal and supplies a series of positive and negative differentiated pulses to the pulse generator 18. The pulse generator 18 derives, in a manner to be described more fully hereinafter, a series of output pulses, the average value of which is representative of the frequency modulation. The integrator 19 derives a signal representative of the average value of the output pulses supplied by the pulse generator 18. This signal representative of the frequency modulation is, in turn, amplified by the audio-frequency amplifier 20 and reproduced by the sound reproducer 21 in a conventional manner.

*Description and operation of pulse generator*

The pulse generator 18, as shown, is similar in construction and operation to a conventional blocking oscillator. In particular, the pulse generator 18 includes an electronic valve shown as a vacuum tube 30 having an input or control electrode 30*a* and first and second output electrodes 30*b* and 30*c*, respectively. Output electrodes 30*b* and 30*c* are the anode electrode and cathode electrode, respectively, of the vacuum tube 30.

The pulse generator 18 additionally includes means for biasing vacuum tube 30 to cutoff, i.e. maintaining the tube normally nonconductive. Vacuum tube 30 is biased to cutoff by a source of negative potential −B coupled to the control electrode 30*a*.

The pulse generator 18 also includes means for coupling a series of repetitive input signals to the control electrode 30*a*, each pulse initiating conduction of the vacuum tube 30 and the derivation of the output pulse. Since vacuum tube 30 is biased to cutoff, half of the differentiated pulses supplied thereto have no effect. Vacuum tube 30 is sensitive to only one polarity of the differentiated pulses, the negative pulses for the circuit arrangement shown, and these pulses are considered to be the input pulses mentioned above which initiate conduction. The series of input pulses is coupled to the anode electrode 30*b*, inverted in transformer 31, and coupled thereby as positive-going pulses to the control electrode 30*a*. The anode electrode 30*b* is coupled to a source of positive potential +B through the primary winding 31*a* of transformer 31, while the control electrode 30*a* is coupled to the previously mentioned source of negative potential −B through the secondary winding 31*b* and the integrating circuit 19.

Transformer 31 also serves to feed back output pulses developed at the anode electrode 30*b* to the control electrode 30*a* for aiding the derivation of the output pulses and thereby derive output pulses having greater durations than the durations of the corresponding input differentiated pulses.

The pulse generator 18 further includes an impedance network 32 composed of the parallel combination of a resistor 33 and a diode rectifier 34, one end of each being connected to the cathode electrode 30*c* and the other end of each being connected to ground potential. Included in the impedance network 32 is a nonlinear energy storage element 35 shown as an iron core inductor.

Initially, vacuum tube 30 is biased to cutoff by the source of negative potential −B coupled to the control electrode 30*a*. Each negative differentiated pulse supplied by the differentiating circuit 17 has sufficient amplitude to overcome the cutoff bias and initiate conduction of vacuum tube 30. This also initiates the derivation of output pulses at both the anode electrode 30*b* and the cathode electrode 30*c*. The output pulse developed at the anode electrode 30*b* is inverted in transformer 31 and thereby coupled with proper polarity back to the control electrode 30*a* to aid in the derivation of the output pulse. Thus, output pulses having greater durations than the durations of the corresponding input pulses are developed at both the anode electrode 30*b* and the cathode electrode 30*c*. The operation just described is the same as the normal operation of a conventional blocking oscillator.

The duration of the output pulses of a blocking oscillator is dependent upon the impedance of the blocking oscillator cathode circuit. Therefore, the duration of the output pulses developed by the pulse generator 18 is dependent upon the impedance of the impedance network 32 connected to the cathode electrode 30*c*. During periods when output pulses are derived, energy produced by these pulses is stored in the iron core inductor 35. During intervening intervals energy previously stored is released. If there is an insufficient amount of time for all the energy which has been previously stored to be released, the residual energy stored at the time the derivation of a pulse is initiated decreases the value of the inductance of the iron core inductor 35 thereby changing its impedance. Thus, the iron core inductor 35 being a nonlinear element is a variable impedance element which, in turn, varies the impedance of the impedance network 32. Since the amount of residual energy stored in the inductor 35 at the time the derivation of a pulse is initiated is dependent upon the repetition rate of the input differentiated pulses, the impedance of the inductor 35 varies in relation to the repetition rate of the input differentiated pulses. Thus, the impedance of the impedance network 32 also varies in relation to the repetition rate of the input differentiated pulses. Since, as previously mentioned, the durations of the output pulses are dependent upon the impedance of the impedance network 32, the durations of the output pulses also vary in relation to the repetition rate of the input differentiated pulses. Another way of expressing this result is that the durations of the output pulses vary in relation to the spacing of the input differentiated pulses. The integrator 19 composed of the parallel circuit of a resistor 36 and a capacitor 37 is placed in series with the secondary winding 31*b* between the control electrode 30*a* and the source of negative potential —B to develop a signal proportional to the average current in the control electrode circuit. While the integrator 19 has been placed in the control electrode circuit, it obviously may be placed in series with the primary winding 31*a* in the anode electrode circuit or between the impedance network 32 and the cathode electrode 30*c* and the same results would be obtained.

By properly choosing values for the various components of the pulse generator 18, the average value of the output pulses may be truly representative of the frequency modulation. As previously mentioned, in the conventional technique of detecting the frequency modulation with a counter-type detector the average value of the audio-frequency signal should be dependent upon the pulse repetition frequency. Since the durations of the pulses developed by the pulse generator 18 are made to vary in area in accordance with the repetition rate of the pulses which are integrated, linearity over a specified frequency range may be achieved if the product of repetition rate and pulse duration is made to vary linearly with frequency. The net effect is an improved audio recovery without loss of linearity since the output pulses derived by the pulse generator 18 have a greater area or energy content than conventionally derived differentiated pulses.

*Description and operation of radar system*

FIG. 2 shows a portion of a radar system which includes a pulse stretching circuit constructed in accordance with the present invention. The radar system may include a pulse source 40, a pulse stretching circuit 41, constructed in accordance with the present invention, a modulator 42, transformer coupled to a transmitter 43 by a transformer 44, and an antenna 45.

In the absence of the pulse stretching circuit 41, the pulse source 40 would be directly connected to the modulator 42. Assuming that the radar signal to be transmitted is a series of pulses, the pulse source 40 would be supplied a series of pulses to the modulator 42 and a series of modulated radio-frequency pulses is developed at the output of the modulator in a conventional manner. If this series of modulated radio-frequency pulses is transformer coupled to transmitter 43 through transformer 44 for transmission by antenna 45 and the pulse spacing is such that the transformer cannot recover between pulses, the width of the pulses shortens as a function of the number of pulses coupled through the transformer.

In order to overcome this undesirable effect, a pulse stretching circuit 41 constructed in accordance with the present invention is placed between the pulse source 40 and the modulator 42. The operation of the pulse stretching circuit 41 is generally similar to the operation of the pulse generator 18 described in connection with FIG. 1 and, therefore, a detailed explanation will be omitted. Elements in FIG. 2 corresponding to elements in FIG. 1 have been given the same reference numerals. Each pulse supplied by the pulse source 40 initiates conduction of the initially nonconductive vacuum tube 30. As indicated in connection with the FIG. 1 apparatus, energy is stored in the iron core inductor 35 due to pulses which are developed during conductivity intervals of the vacuum tube 30. If there is an insufficient amount of time for all the energy which has been previously stored to be released, the residual energy stored at the time the derivation of a pulse is initiated decreases the value of the inductance of the iron core inductor thereby changing its impedance and causing a corresponding increase in the duration of the pulse being developed at that time. By proper choice of components, the duration of the pulses developed by the pulse stretching circuit 41 may be made to vary in such a manner as to offset the shortening which takes place when the modulated radio-frequency pulses are coupled through transformer 44.

While there have been described what are at present considered to be the preferred embodiments of this invention, it will be obvious to those skilled in the art that various changes and modifications may be made therein without departing from the invention and it is, therefore, aimed to cover all such changes and modification as fall within the true spirit and scope of the invention.

What is claimed is:

1. Apparatus for generating an electrical signal comprising: means for supplying a repetitive first signal; circuit means responsive to said first signal for generating a second signal having first and second characteristics, at least one of said characteristics being determined by the repetition rate of said first signal; and a nonlinear energy storage element coupled to said circuit means and being responsive to at least one of said characteristics of said second signal for controlling said circuit means so as to cause the other of said characteristics to vary in a predetermined manner.

2. Apparatus for generating variable duration pulses comprising: means for supplying a repetitive first signal; circuit means responsive to said first signal and including an impedance network for generating output pulses at a repetition rate determined by the repetition rate of said first signal the durations of said pulses being determined by the impedance of said impedance network; and a nonlinear energy storage element coupled to said impedance network and responsive to a characteristic of said pulses for controlling the impedance of said impedance network by storing energy produced by said pulses and releasing energy during intervening intervals, the amount of energy stored in said element determining the impedance of said element; thereby controlling said impedance network so as to vary the duration of said pulses in a predetermined manner.

3. Apparatus for generating an electrical signal comprising: means for supplying a repetitive first signal; circuit means responsive to said first signal for generating a repetitive second signal whose repetition rate is determined by the repetition rate of said first signal; and a nonlinear energy storage element coupled to said circuit means and being responsive to the repetition rate of said second signal for controlling said circuit means so as to vary the duration of said second signal in a predetermined manner.

4. Apparatus for generating variable duration pulses comprising: means for supplying a repetitive first signal having a repetition rate which varies in a predetermined manner; circuit means responsive to said first signal and including an impedance network for generating output pulses at a repetition rate determined by the repetition rate of said first signal, the durations of said pulses being determined by the impedance of said impedance network; and a nonlinear energy storage element coupled to said impedance network and responsive to at least the repetition rate of said pulses for controlling the impedance of said impedance network by storing energy during periods pulses are derived and releasing energy during intervening intervals, the amount of residual energy stored in said element at the time the derivation of a pulse is initiated determining the impedance of said element for the derivation of that pulse, thereby controlling said impedance work so as to vary the durations of said pulses in accordance with variations in the repetition rate of said pulses.

5. Apparatus for measuring the repetition rate of a series of repetitive input pulses comprising: an electron device; means for biasing said electron device to nonconduction; means for supplying said series of input pulses to an input of said electron device, each pulse initiating conduction of said electron device and the derivation of an output pulse; feedback means coupled between an output and an input of said electron device and said input electrode for aiding the derivation of said output pulses to thereby derive output pulses having greater durations than the durations of the corresponding input pulses; an impedance network coupled to said electron device, the impedance of said impedance network determining the durations of said output pulses; and a nonlinear energy storage element coupled to said impedance network and responsive to the repetition rate of said output pulses for controlling the impedance of said impedance network by storing energy during periods output pulses are derived and releasing energy during intervening intervals, the amount of residual energy stored in said element at the time the derivation of an output pulse is initiated determining the impedance of said element for the derivation of that output pulse, thereby controlling said impedance network so as to vary the durations of said output pulses in accordance with variations in the repetition rate of said pulses, the average value of said output pulses being representative of the repetition rate of said repetitive input pulses.

6. Apparatus for detecting the modulation of a frequency-modulated signal comprising: an electron device; means for biasing said electron device to nonconduction; means for amplitude-limiting said frequency-modulated signal; means for developing from said amplitude-limited signal a series of same polarity differentiated pulses, the repetition rate thereof being representative of the frequency-modulation; means for supplying said series of differentiated pulses to said electron device, each pulse initiating conduction of said electron device and the derivation of an output pulse; feedback means coupled between an output and an input of said electron device and said input electrode for aiding the derivation of said output pulses to thereby derive output pulses having greater durations than the durations of the corresponding input pulses; an impedance network coupled to said electron device, the impedance of said impedance network determining the durations of said output pulses; and a nonlinear energy storage element coupled to said impedance network and responsive to the repetition rate of said output pulses for controlling the impedance of said impedance network by storing energy during periods pulses are derived and releasing energy during intervening intervals, the amount of residual energy stored in said element at the time the derivation a pulse is initiated determing the impedance of said element for the derivation of that pulse, thereby controlling said impedance network so as to vary the durations of said output pulses in accordance with variations in the repetition rate of said output pulses, the average value of said output pulses being representative of said frequency modulation.

7. Apparatus for producing an electrical signal comprising: means for supplying a repetitive first signal; circuit means responsive to said first signal for generating a repetitive second signal whose repetition rate is determined by the repetition rate of said first signal; and a nonlinear energy storage element coupled to said circuit means and being responsive to the number of second signals previously developed for controlling said circuit means so as to vary the duration of said second signals in a predetermined manner.

8. Apparatus for generating variable duration pulses comprising: means for supplying a repetitive first signal, circuit means responsive to said first signal and including an impedance network for generating output pulses at a repetition rate determined by the repetition rate of said first signal, the durations of said pulses being determined by the impedance of said impedance network; and a nonlinear energy storage element coupled to said impedance network and responsive to the number of pulses previously developed for controlling the impedance of said impedance network by storing energy during periods pulses are derived and releasing energy during intervening intervals, the amount of residual energy stored in said element at the time the derivation of a pulse is initiated determining the impedance of said element for the derivation of that pulse, thereby controlling the impedance network so as to vary the durations of said pulses in accordance with the number of pulses previously derived.

References Cited by the Examiner

UNITED STATES PATENTS

| | | | |
|---|---|---|---|
| 2,445,933 | 7/1948 | Beste | 331—149 |
| 2,464,259 | 3/1949 | Proskaner | 331—149 X |
| 2,484,556 | 10/1949 | Custin | 329—127 |
| 2,699,498 | 1/1955 | Guenther | 329—128 X |
| 3,038,128 | 6/1962 | Fischman et al. | 331—112 |
| 3,067,393 | 12/1962 | Murray | 332—14 |

ROY LAKE, *Primary Examiner.*

ARTHUR GAUSS, *Examiner.*